United States Patent Office 2,890,959
Patented June 16, 1959

2,890,959
EMULSIFIED OLEAGINOUS SPREAD CONTAINING ESSENTIAL FATTY ACIDS AND PROCESS OF MAKING SAME

Robert A. Phillips, Indianapolis, Ind., assignor to Allied Laboratories, Inc., Kansas City, Mo., a corporation of Delaware No Drawing. Application April 10, 1957
Serial No. 651,807
11 Claims. (Cl. 99—123)

This invention relates to the production of modified edible fat products containing a relatively large proportion of essential fatty acids and suitable for table and/or cooking uses. More particularly, the invention relates to a solidified edible fat product comprising a physical mixture containing a liquid vegetable oil of high essential fatty acid content modified physically by admixture with from about 8 to 25% of a hydrogenated vegetable oil having a melting point falling within the range from about 112 to 145° F., the whole being emulsified with an aqueous liquid such as milk.

In the past the usual method of increasing body and raising the melting point of fatty oils used in the manufacture of oleaginous spreads such as margarine has been hydrogenation. Hydrogenation does effectively accomplish its purposes of raising the melting point of the oil and introducing a consistency suitable for spreads but it at the same time largely destroys the essential fatty acid moieties of the oils. These essential fatty acids are polyunsaturated and it is well known that they are among the first attacked by hydrogenation processes.

The importance of retaining the essential fatty acid content of fats used in the diet of man lies in the effectiveness of these acids in controlling blood cholesterol levels. High blood cholesterol levels have repeatedly been associated with a higher incidence of atherosclerosis by a large number of investigators. Recent data show that oils high in content of unsaturated fatty acids and more particularly in content of essential fatty acids cause significantly lower blood cholesterol levels than do fats of high saturated fatty acid content fed at the same levels. In fact, recent data show that even the addition of a fat high in essential fatty acid content to a diet high in saturated fatty acid lowers blood cholesterol levels. The best summation of our present state of knowledge is that the greater the proportion of essential fatty acids in the diet, the lower the blood cholesterol levels that can be expected, and the most favorable diet is one of low fat content but with that fat being high in the proportions of essential fatty acids. Some of the published reports bearing on these conclusions are:

(1) Bronte-Stewart, B. B., Eales, L., Antonis, A., and Brock, J. F., Lancet (April 28, 1956), 521–526.

(2) Portman, O. W., Hegsted, J. M., Stare, F. J., Bruno, D., Murphy, R., Sinisteria, L., Journal of Experimental Medicine, vol. 104, 1956, pp. 817–828.

(3) Beveridge, J. M. R., Cornell, W. F., and Mayer, G., Circulation, 12 (1955), 499.

(4) Kinsell, L. W., Michaels, G. D., Cochrane, G. C., Partridge, G. W., Jahn, J. P., and Balch, H. E., Diabetics, 3 (1954), 113–119.

In accordance with the present invention I have found it possible to produce a solidified oleaginous product having physical properties comparable to margarine and at the same time retaining a high essential fatty acid content. In carrying out my invention, margarine-like products of high essential fatty acid content are produced by melting with a vegetable oil such as corn, soya, cottonseed, safflower, sunflower, or sesame oil, 8 to 25% of a hydrogenated vegetable oil having a melting point of from 112 to 145° F., and emulsifying the whole with milk or similar material and then cooling quickly to obtain a micro-crystalline material. Additional materials well known to the art such as salt, flavor, emulsifier, stabilizer, antioxidant, antioxidant synergist, preservative, and color are added to make a preferred margarine-type product.

One important advantage of my product is that, depending on the particular vegetable oil employed, my product may contain as much as 40% of its weight as essential fatty acids or in exceptional cases even higher percentages. An important corollary is that typically less than 25% of the weight of the product is saturated fatty acids.

Another advantage is that my products remain spreadable over a wider temperature range than does butter or the presently available margarines. My products will not only spread readily on bread at refrigerator temperature but in preferred modifications do not melt or separate at temperatures as high as 92° F. In laboratory tests no stratification was noted after a week's exposure to a temperature of 85° F.

From a health standpoint my products have the further advantage over butter and similar fats from animal sources in that they do not contain cholesterol.

Ordinary liquid vegetable oils are not entirely satisfactory for use in baking cakes, cookies, pies, etc. My products possess the distinct advantage of being more readily workable into pie crusts and other baked goods than do unthickened vegetable oils.

The amount and melting point of the hydrogenated oil incorporated in the product is dictated by the twin aims of keeping the amount of saturated fatty acids as low as possible and the desire of obtaining a product of favorable physical properties. Physical properties desired are spreadability at refrigerator temperatures, ability to withstand temperatures in the neighborhood of 90° without melting or separation and lack of tendency to cling to the mouth. This latter property is known as "getaway"; those products which do not cling to the mouth when eaten being described as having satisfactory "getaway." Softness as a function of temperature is measured by penetrometer tests at different temperatures. In the present work penetration tests were measured with an ASTM penetrometer with a cone of 61 gm. weight. Twelve seconds were allowed to elapse between release of the cone and arrest of its motion. Penetrometer readings measure millimeters' penetration of the cone. Under these conditions spreads at the lower limit of convenient bread-spreadability give penetrometer readings of 100 to 130. The upper limit of acceptability is indicated by penetrometer readings of about 320-350.

Table I indicates experience with some preparations made using corn oil as the vegetable oil, 16% skim milk to prepare emulsions and various hydrogenated oils as indicated.

TABLE I

| Melting Point Partially Hydrogenated Fat | Identity Partially Hydrogenated Fat | Percent Total Fats Partially Hydrogenated Fat | Penetrometer Readings | | | Getaway |
|---|---|---|---|---|---|---|
| | | | 42° F. | 72° F. | 92° F. | |
| 118° | coconut | 10 | 350 | liq. | liq. | Satis. |
| 118° | coconut | 15 | 316 | liq. | liq. | Satis. |
| 118° | coconut | 20 | 231 | 329 | liq. | Satis. |
| 112° | coconut | 25 | 240 | 300 | liq. | Satis. |
| 126° | soy | 20 | 218 | 260 | 350 | Satis. |
| 132° | soy | 15 | 245 | 276 | 350 | Satis. |
| 138° | soy | 15 | 222 | 227 | 282 | Satis. |
| 143° | soy | 12 | 221 | 232 | 270 | Fair. |
| 148° | peanut | 10 | 285 | 285 | 310 | Poor. |
| 152° | cottonseed | 10 | 292 | 289 | 350 | Poor. |
| Butter | | | 57 | 190 | liq. | Satis. |
| Margarine | | | 129 | 186 | liq. | Satis. |

The following specific examples will serve to illustrate my invention:

Example I 20 grams of a commercially available hydrogenated coconut oil of melting point 112° F. was melted and 60 gm. of corn oil, 0.5 gm. of glyceryl monostearate, 0.1 gm. lecithin and 1 drop of a commercial butter flavor added and the whole warmed to 135° F. 16 grams of skim milk and 3 grams of salt were added and the whole emulsified. It was then quickly cooled by adding finely powdered Dry Ice with stirring.

Example II 2,637 gm. of a commercially available hydrogenated coconut oil of melting point 118° F. was warmed to melt and 10,547 gm. of corn oil, 80 gm. of glyceryl monostearate, 28 gm. of lecithin, 500 mg. of yellow dye and 80 cc. of a commercial flavor were added. The whole was heated to 135° F. and emulsified with 2656 gm. of skim milk. It was immediately passed through a commercial ice cream machine with refrigerant at 0° F. being used to cool the freezing chamber. The product was a margarine-like material which showed good bread-spreadability at refrigerator temperatures and withstood a week's exposure to 85° F. without melting of stratification.

Example III 12 gm. of a commercially available hydrogenated coconut oil of melting point 118° F. was warmed to melt and 68 gm. of soy oil and 0.1 gm. of lecithin was added. The whole was warmed to 135° F. and then emulsified with 16 gm. of skim milk. It was then quickly cooled by adding finely powdered Dry Ice with stirring.

Example IV 12 gm. of hydrogenated soy oil of melting point 138° F. was warmed to melt and 68 gm. of corn oil, 0.1 gm. lecithin and 0.5 gm. of glyceryl monostearate added. The whole was warmed to 135° F. and emulsified with 16 gm. of skim milk. It was then quickly cooled by adding finely powdered Dry Ice with stirring.

In the foregoing examples, the vegetable oils may be replaced entirely or in part by any of the other vegetable oils mentioned heretofore and having a high essential fatty acid content. The oils used may be refined or in the case of certain of the oils such as corn oil be the crude expressed oil. The proportion of these vegetable oils may be varied from about 75% to 92% of the total fat of the compositions. Likewise, in the foregoing examples the particular hydrogenated vegetable oil products employed may be replaced entirely or in part by other commercially available hydrogenated vegetable oils so long as the melting point of the hydrogenated oil portion of the composition is within the range 112°–145° F.

In the margarine-type product illustrated in Examples I and II the butter flavor employed may comprise any of those that are accepted for use in edible products and frequently comprises di-acetyl and other ketones, butyric acid and other acids, ethyl butyrate and other esters.

Also, when desired, my products may include antioxidants that are acceptable for use in edible fats and oils. Among these are: normal propyl gallate, the several tocopherols, butylated hydroxyanisole (BHA), butylated hydroxytoluene (BHT), nordihydroguaiaretic acid (NDGA).

The foregoing descriptions and illustrations show that my process comprises admixing about 73 to about 90 parts by weight of a fatty mixture comprising 75% to 92% of an edible vegetable oil having a high essential fatty acid content and 8% to 25% of a hydrogenated vegetable oil having a melting point within the range of 112° to 145° F., with 0.1 part to 2.0 parts by weight of an emulsifier selected from the group consisting of glyceryl monostearate and lecithin and about 10 parts to about 25 parts by weight of a fluid aqueous milk product said admixture being carried out at a temperature above the melting point of said fatty acid mixture then emulsifying the mixture and rapidly cooling said emulsified mixture to give a solidified spreadable product.

In somewhat more detail my process comprises admixing about 73 parts to about 90 parts by weight of a fatty mixture comprising 75% to 92% of an edible vegetable oil selected from the group consisting of corn, soya, safflower, cottonseed, sunflower and 8% to 25% of a hydrogenated vegetable oil having a melting point within the range of 112° to 145° F., with 0.1 part to 2.0 parts by weight of an emulsifier selected from the group consisting of glyceryl monostearate and lecithin and about 10 parts to about 25 parts by weight of a fluid aqueous milk product said admixture being carried out at a temperature above the melting point of said fatty acid mixture then emulsifying the mixture and rapidly cooling said emulsified mixture to give a solidified spreadable product.

Thus the edible fatty products of my invention include an emulsified oleaginous spread composition comprising about 73 to about 90 parts by weight of a fatty mixture comprising 75% to 92% of an edible vegetable oil selected from the group consisting of corn, soya, safflower, cottonseed, sunflower and 8% to 25% of a hydrogenated vegetable oil having a melting point within the range of 112° to 145° F., 0.1 part to 2.0 parts by weight of an emulsifier selected from the group consisting of glyceryl monostearate and lecithin and about 10 parts to about 25 parts by weight of a fluid aqueous milk product.

A preferred composition of my invention is an emulsified oleaginous spread composition comprising about 73 to about 90 parts by weight of a fatty mixture comprising 75% to 92% of corn oil and 8% to 25% of a hydrogenated coconut oil having a melting point within the range of 112° to 120° F., 0.1 part to 2.0 parts by weight of an emulsifier selected from the group consisting of glyceryl monostearate and lecithin and about 10 parts to about 25 parts by weight of a fluid aqueous milk product and minor proportions of salt, flavoring and an antioxidant.

The term "a high content of essential fatty acids" refers to those vegetable oils which normally contain a high proportion of the polyunsaturated fatty acids such as linoleic and linolenic acid. In the textbook entitled "Vegetable Fats and Oils" by E. W. Eckey, published in 1954 by the Reinhold Publishing Corporation, the linoleic acid content of the vegetable oils from corn, soya, safflower, cottonseed and sunflower are shown to be greater than 40%.

I claim:

1. The process comprising admixing about 73 to about 90 parts by weight of a fatty mixture comprising 75% to 92% of an edible vegetable oil selected from the group consisting of corn, soya, safflower, cottonseed and sunflower and mixtures thereof and 8% to 25% of a hydrogenated vegetable oil having a melting point within the range of 112° to 145° F., with 0.1 part to 2.0 parts by weight of an emulsifier selected from the group consisting of glyceryl monostearate and lecithin and mixtures thereof and about 10 parts to about 25 parts by weight of a fluid aqueous milk product said admixture being carried out at a temperature above the melting point of said fatty acid mixture then emulsifying the mixture and rapidly cooling said emulsified mixture to give a solidified spreadable product.

2. The process comprising admixing about 73 to about 90 parts by weight of a fatty mixture comprising 75% to 92% of an edible vegetable oil selected from the group consisting of corn, soya, safflower, cottonseed and sunflower and mixtures thereof and 8% to 25% of a hydrogenated coconut oil having a melting point within the range of 112° to 120° F., with 0.1 part to 2.0 parts by weight of an emulsifier selected from the group consisting of glyceryl monostearate and lecithin and mixtures thereof and about 10 parts to about 25 parts by weight of a fluid aqueous milk product said admixture being carried out at a temperature above the melting point of said fatty acid mixture then emulsifying the mixture and rapidly cooling said emulsified mixture to give a solidified spreadable product.

3. The process comprising admixing about 73 to about 90 parts by weight of a fatty mixture comprising 75% to 92% of corn oil and 8% to 25% of a hydrogenated coconut oil having a melting point within the range of 112° to 120° F., with 0.1 part to 2.0 parts by weight of an emulsifier selected from the group consisting of glyceryl monostearate and lecithin and mixtures thereof and about 10 parts to about 25 parts by weight of a fluid aqueous milk product said admixture being carried out at a temperature above the melting point of said fatty acid mixture then emulsifying the mixture and rapidly cooling said emulsified mixture to give a solidified spreadable product.

4. The process comprising admixing about 73 to about 90 parts by weight of a fatty mixture comprising 75% to 92% of soya oil and 8% to 25% of a hydrogenated coconut oil having a melting point within the range of 112° to 120° F., with 0.1 part to 2.0 parts by weight of an emulsifier selected from the group consisting of glyceryl monostearate and lecithin and mixtures thereof and about 10 parts to about 25 parts by weight of a fluid aqueous milk product said admixture being carried out at a temperature above the melting point of said fatty acid mixture then emulsifying the mixture and rapidly cooling said emulsified mixture to give a solidified spreadable product.

5. The process of claim 3 which also includes the step of adding minor proportions of salt, flavoring and antioxidants to the emulsified mixture.

6. The process of claim 4 which also includes the step of adding minor proportions of salt, flavoring and antioxidants to the emulsified mixture.

7. An emulsified oleaginous spread composition comprising about 73 to about 90 parts by weight of a fatty mixture comprising 75% to 92% of an edible vegetable oil selected from the group consisting of corn, soya, safflower, cottonseed and sunflower and mixtures thereof and 8% to 25% of a hydrogenated vegetable oil having a melting point within the range of 112° to 145° F., 0.1 part to 2.0 parts by weight of an emulsifier selected from the group consisting of glyceryl monostearate and lecithin and mixtures thereof and about 10 parts to about 25 parts by weight of a fluid aqueous milk product.

8. An emulsified oleaginous spread composition comprising about 73 to about 90 parts by weight of a fatty mixture comprising 75% to 92% of corn oil and 8% to 25% of a hydrogenated coconut oil having a melting point within the range of 112° to 120° F., 0.1 part to 2.0 parts by weight of an emulsifier selected from the group consisting of glyceryl monostearate and lecithin and mixtures thereof and about 10 parts to about 25 parts by weight of a fluid aqueous milk product.

9. An emulsified oleaginous spread composition comprising about 73 to about 90 parts by weight of a fatty mixture comprising 75% to 92% of soya oil and 8% to 25% of a hydrogenated coconut oil having a melting point within the range of 112° to 120° F., 0.1 part to 2.0 parts by weight of an emulsifier selected from the group consisting of glyceryl monostearate and lecithin and mixtures thereof and about 10 parts to about 25 parts by weight of a fluid aqueous milk product.

10. An emulsified oleaginous spread composition comprising about 73 to about 90 parts by weight of a fatty mixture comprising 75% to 92% of an edible vegetable oil selected from the group consisting of corn, soya, safflower, cottonseed and sunflower and mixtures thereof and 8% to 25% of a hydrogenated vegetable oil having a melting point within the range of 112° to 145° F., 0.1 part to 2.0 parts by weight of an emulsifier selected from the group consisting of glyceryl monostearate and lecithin and mixtures thereof and about 10 parts to about 25 parts by weight of a fluid aqueous milk product and minor proportions of salt, flavoring and an antioxidant.

11. An emulsified oleaginous spread composition comprising about 73 to about 90 parts by weight of a fatty mixture comprising 75% to 92% of corn oil and 8% to 25% of a hydrogenated coconut oil having a melting point within the range of 112° to 120° F., 0.1 part to 2.0 parts by weight of an emulsifier selected from the group consisting of glyceryl monostearate and lecithin and mixtures thereof and about 10 parts to about 25 parts by weight of a fluid aqueous milk product and minor proportions of salt, flavoring and an antioxidant.

References Cited in the file of this patent

UNITED STATES PATENTS

| | | |
|---|---|---|
| 1,475,574 | Gesell | Nov. 27, 1923 |
| 2,022,924 | Reynolds | Dec. 3, 1935 |
| 2,197,457 | Werk et al. | Apr. 16, 1940 |
| 2,434,429 | Nelson | Jan. 13, 1948 |